June 4, 1946. D. W. MOLINS ET AL 2,401,654
AMMUNITION HOPPER FOR USE ON AUTOMATIC GUNS
Filed Jan. 6, 1944 5 Sheets-Sheet 1
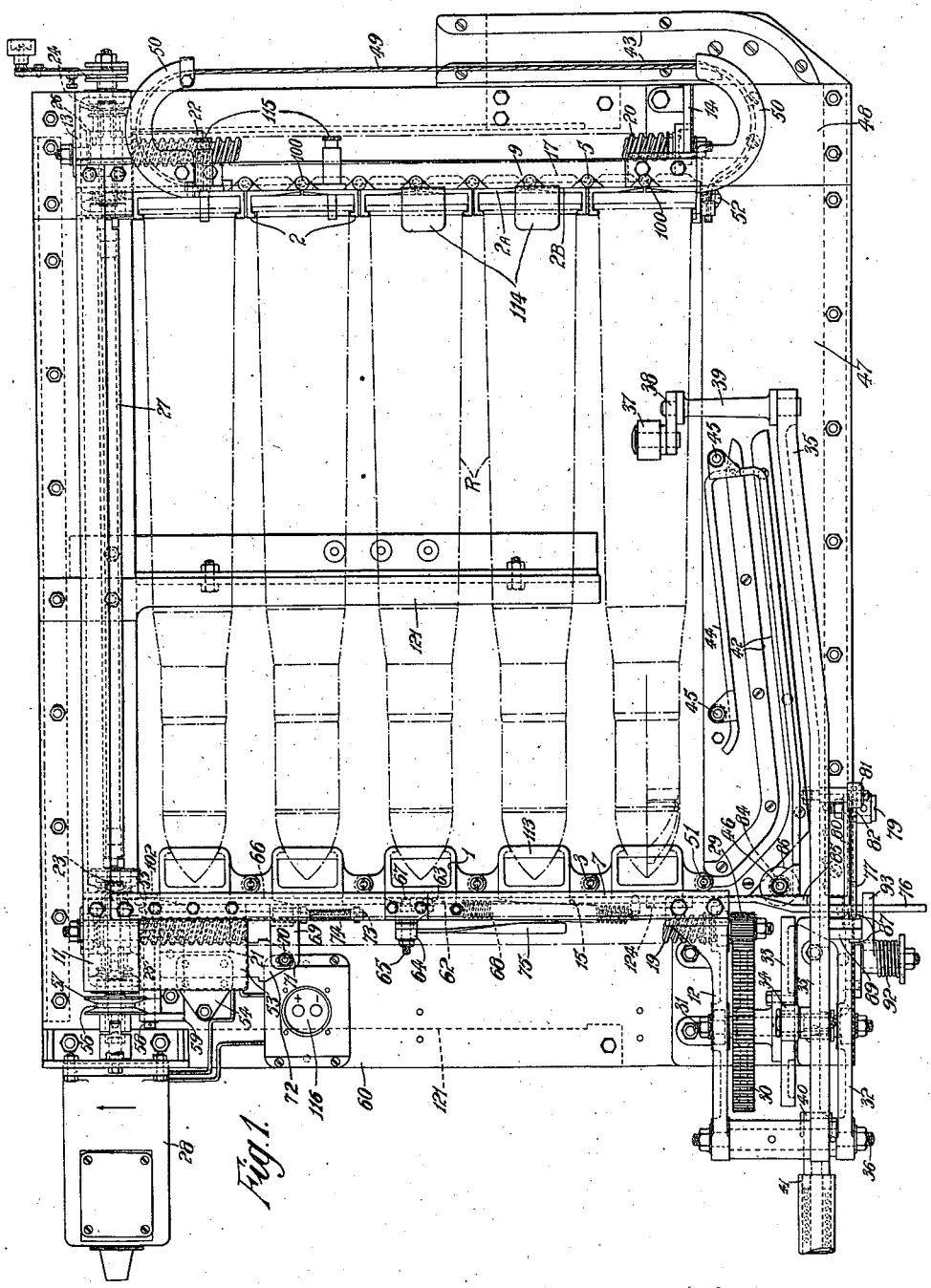
Inventors
Desmond Walter Molins
Felix Frederic Ruau
BY Loyd Hall Sutton
ATTORNEY

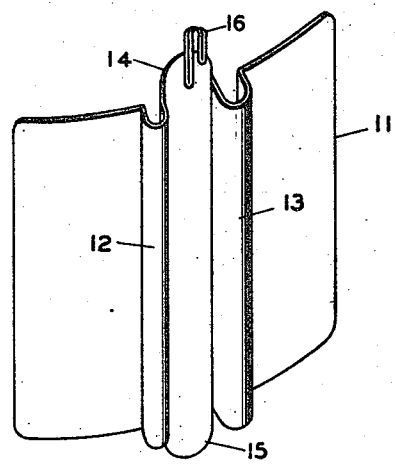
Fig. I
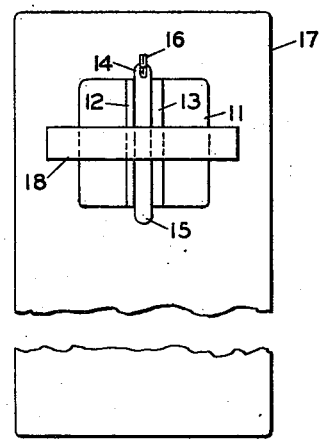
Fig. II
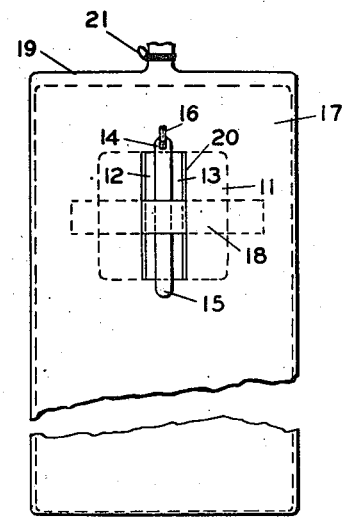
Fig. III